Dec. 22, 1931.  W. E. COLVIN  1,837,533
SHORT CIRCUITING SWITCH
Filed April 15, 1930
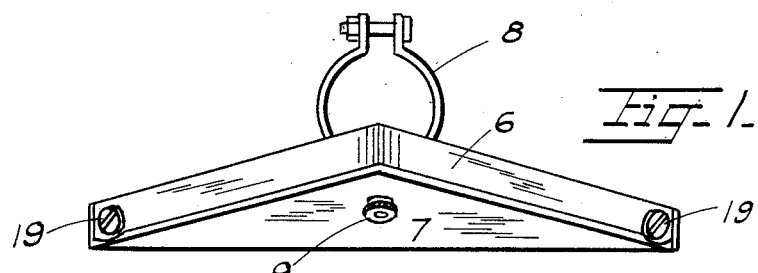
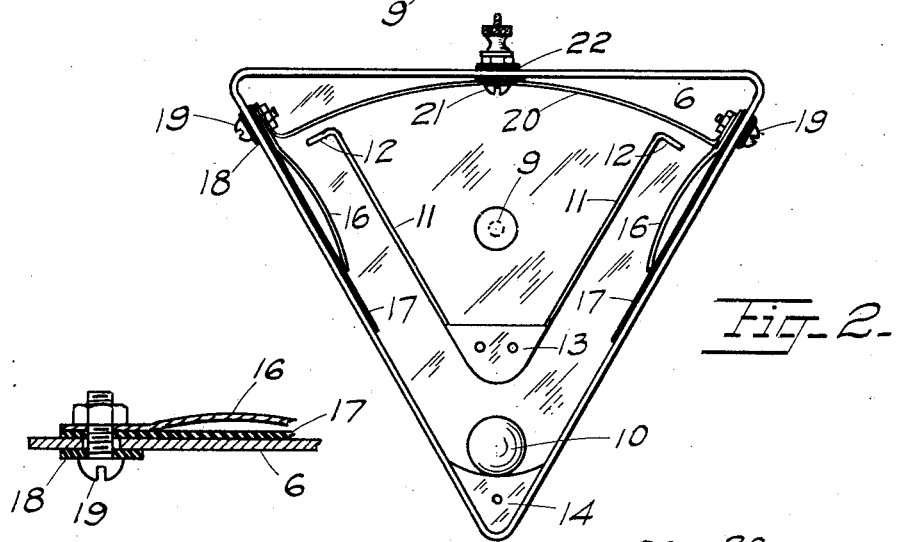
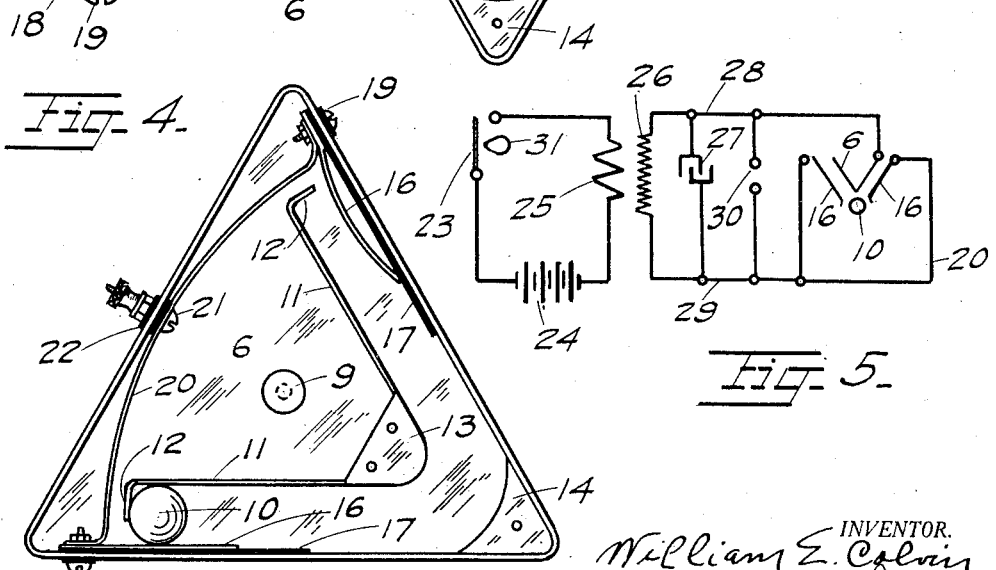

Patented Dec. 22, 1931

1,837,533

UNITED STATES PATENT OFFICE

WILLIAM E. COLVIN, OF OAKLAND, CALIFORNIA

SHORT CIRCUITING SWITCH

Application filed April 15, 1930. Serial No. 444,438.

The invention is for a short circuiting switch, and has special reference to the short circuiting of the high tension side of an ignition system in automotive vehicles in the event of dangerous tipping or turning over of the vehicle.

The primary object of the invention is to provide a short circuiting switch especially applicable to motorcycles, but which may be applied to any type of vehicle, motor boat or other conveyance, and which will automatically short circuit the ignition system in the event of overturning or dangerous tipping of the vehicle, but which will not short circuit due to bumps or jarring.

Another object of the invention is to provide a device as described which is readily attached or detached and which may readily be disconnected from the circuit when desired, and which may readily be applied to existing vehicles by attachment to some part of the frame or ground circuit of a vehicle, and making one additional electrical connection to the high tension lead of the ignition system.

A further object of the invention is to provide a device of the character described which is extremely simple in operation having only a single moving part and which is proof against interruptions, economical to construct, and efficient in operation.

One of the greatest dangers of motorcycle operation and which has resulted in many injuries and considerable damage to property is the ability of the motor to continue running after the motorcycle has turned over, in some cases injuring the operator by the fast moving parts, and in some cases when the operator pushes the motorcycle off himself, possibly righting it, the motorcycle will travel for some distance endangering lives and damaging property.

The invention consists primarily of a triangular housing inverted, with a ball resting in the apex. A contact spring is disposed inside and insulated from the housing on each side of the triangle, the device being mounted with the triangle base up, whereby, if the device is tilted sufficiently in any direction the ball rolls to one of the contacts making a circuit between the contact and the housing. The housing is grounded and the contacts are in circuit with the high tension lead of the ignition system. Short circuiting of the high tension lead to the housing prevents the sparking of the spark plugs, thereby stopping the motor.

Referring to the accompanying drawings, in which

Fig. 1 is a perspective view of the invention;

Fig. 2 is an elevation of the invention with cover removed and in right position;

Fig. 3 is a tilted view of the device showing the ball making contact, and short circuiting the high tension circuit;

Fig. 4 is a sectional elevation taken through the side of the housing and contact spring;

Fig. 5 is a wiring diagram of an ignition circuit showing the device included therein.

Similar reference characters are used to designate similar parts throughout the several views.

The device consists of a housing 6 having a cover 7 and a clamping member 8 for attachment to the frame of a motorcycle. A screw and nut 9 provides means for retaining the cover in place. The housing 6 is of sufficient depth to freely receive a conductive ball 10, and has affixed to the bottom the upstanding conductive members 11 bent as at 12 to limit the movement of the ball 10. Blocks of soft rubber or other resilient material 13 and 14 are fixed as indicated to cushion and silence the ball during normal operation of the device.

The contacts 16 are formed of resilient conductive material in the form of arcuate leaf springs, and are insulated from the housing 6 by strips of insulation 17 and insulating washers 18 and retained by screws 19. A conductive member 20 connects the two contacts 16 with the terminal screw 21 insulated from the housing by insulating washers 22.

The wiring diagram illustrates the principle of operation as related to the ordinary battery type of ignition. The usual make and break switch 23 is inserted in circuit with a battery 24 and the primary of an induction coil 25, the secondary 26 having in shunt the usual condenser 27, one side of the secondary being grounded to the engine frame 28, the high tension lead 29 being carried through a distributor, not indicated, and thence to the spark plug indicated as a spark gap 30. The housing 6 is grounded to the frame 28 and contacts 16 are in circuit with the high tension lead 29. In operation with breaker switch 23 closed, a current flows from the battery 24 through the primary 25 and as the cam 31 revolves it opens the breaker switch 23 interrupting the current which results in an induced high tension current in the secondary 26 and stored in condenser 27 which is released across the spark gap 30. In the event of the vehicle turning over, the ball 10 rolls between and makes contact between the members 11 and contacts 16 as indicated in Fig. 3 causing a short circuit through which the potential energy is dissipated, preventing a spark across the gap 30, in this manner stalling the motor. As soon as the vehicle is again righted, the ball drops back between blocks 13 and 14 permitting further operation of the motor.

Having described an operative method of constructing and using the device, it will be understood that variations in design, construction and arrangement of parts which are consistent with the scope of the appended claims may be resorted to without detracting from the spirit or scope of the invention or sacrificing any of the advantages thereof.

I claim:—

1. A short circuiting switch, in combination, a grounded conductive housing of triangular form with normally depending vertex and trackways incorporating the sides and integral parallel members, contacts fixed to said sides and insulated therefrom, and a ball normally retained in said depending vertex and cushioning means therein for silencing purposes, said ball being adapted to travel in said trackways and to complete a circuit through said housing and said contact, said contacts being in circuit with a high tension lead.

2. A short circuiting switch comprising in combination a triangular housing and a cover therefor, parallel track members spacedly related to the two sides thereof, arcuately formed resilient contact strips attached to said sides and insulated therefrom, an electrical connection between said contact strips and to a terminal binding post insulated from said housing, a conductive ball adapted to freely travel between said sides and said parallel track members and normally disposed in the dependent vertex of said housing, and cushioning means above and below said ball when in normal disposition for silencing the impact thereof, and means for attaching and grounding said housing to the frame of an automotive vehicle.

In testimony whereof I have affixed my signature.

WM. E. COLVIN.